United States Patent [19]
Sopory
[11] 4,318,881
[45] Mar. 9, 1982

[54] METHOD FOR ANNEALING PTC COMPOSITIONS

[75] Inventor: Umesh K. Sopory, San Jose, Calif.
[73] Assignee: Raychem Corporation, Menlo Park, Calif.

[21] Appl. No.: 150,911
[22] Filed: May 19, 1980
[51] Int. Cl.[3] .......... B29C 25/00
[52] U.S. Cl. .......... 264/346; 264/105
[58] Field of Search .......... 264/104, 105, 235, 346; 260/42.27

[56] References Cited

U.S. PATENT DOCUMENTS 3,823,217 7/1974 Kampe .......... 264/105
3,861,029 1/1975 Smith-Johannson et al. .......... 264/346
3,914,363 10/1975 Bedard et al. .......... 264/105
4,177,376 12/1979 Horsma et al. .......... 219/504

*Primary Examiner*—James B. Lowe
*Attorney, Agent, or Firm*—Lyon & Lyon

[57] ABSTRACT

A method of annealing a PTC conductive polymer composition comprising a mixture of two crystalline polymers. Compositions having improved electrical characteristics are obtained by annealing at a temperature between the melting points of the two polymers, preferably closer to the melting point of the lower melting polymer. Particularly useful results are obtained when the annealing method is applied to a self-limiting heater in which the PTC core comprises carbon black dispersed in a mixture of polymers, one of which has a melting point of at least 160° C., preferably at least 200° C., e.g. a mixture of polyvinylidene fluoride and an ethylene/tetrafluoroethylene copolymer.

29 Claims, No Drawings

METHOD FOR ANNEALING PTC COMPOSITIONS

BACKGROUND OF THE INVENTION

1. Field of the Invention

This invention relates to the annealing of PTC conductive polymer compositions.

2. Summary of the Prior Art

PTC conductive polymer compositions are known for use in self-limiting strip heaters and in other electrical devices; such compositions can contain two crystalline polymers having substantially different melting points. It is also known to anneal PTC compositions, after they have been shaped, in order to reduce their resistivity, by heating them for extended period, e.g. of several hours, at a temperature above the melting point of the composition. Reference may be made for example to U.S. Pat. Nos. 3,793,716, 3,823,217, (Kampe), 3,861,029 (Smith-Johannsen et al), 3,914,363 (Bedard et al) and 4,177,376 (Horsma et al) and to commonly assigned U.S. patent applications Ser. Nos. 84,352 (Horsma et al), 88344 (Lutz) and the continuation-in-part thereof (MPO701) Ser. No. 134,354 732,792 (Van Konynenburg et al), now abandoned 750,149, (Kamath et al), now abandoned, 751,095 (Toy et al), now abandoned, 798,154 (Horsma), now abandoned, 965,343 (Van Konynenburg et al), now U.S. Pat. No. 4,237,441, 965,344 (Middleman et al), now U.S. Pat. No. 4,238,812, 965,345 (Middleman et al), now abandoned, and 75,413 (Van Konynenburg) and the eight applications filed Apr. 21, 1980 by Gotcher et al (MPO712, 157/111) Ser. No. 141,984, Middleman et al (MPO713, 157/112) Ser. No. 141,987, Fouts et al (MPO714, 157/113) Ser. No. 141,988, Evans (MPO715, 157/114) Ser. No. 141,989, Walty (MPO719, 157/161) Ser. No. 141,990, Fouts et al (MPO720, 157/162) Ser. No. 141,991, Middleman et al (MPO724, 157/167) Ser. No. 153,053 and Middleman et al (MPO725, 157/168) Ser. No. 142,054. The disclosure of each of these patents and applications is incorporated herein by reference.

I have discovered that when a PTC composition containing a mixture of two crystalline polymers of different melting points is annealed at a temperature between the two melting points, the annealed composition has improved electrical properties as compared to a composition annealed at a temperature above the higher melting point, as recommended by the prior art. The improved electrical properties can for example be improved resistance stability and/or linearity ratio when the composition is heated externally and/or when it is heated internally by passing current through it, for extended periods, e.g for 1000 hours or more.

In one aspect, therefore, this invention provides a method of modifying the electrical characteristics of an electrical device comprising a PTC element composed of a conductive polymer composition which exhibits PTC behavior and which comprises (i) a polymer component which comprises a mixture of a first crystalline polymer having a first melting point $T_1$ and second crystalline polymer having a second melting point $T_2$ which is at least $(T_1+25)$°C., and (ii) a particulate filler component which has been dispersed in said polymer component and which comprises a conductive filler; which method comprises annealing said device at a temperature $T_A$ which is between $T_1$ and $T_2$ for a time sufficient to reduce the resistivity at 25° C. of said conductive polymer composition from a first value, $\rho_o$, prior to said annealing to a second value, $\rho_A$, after said annealing, where $\rho_A$ is less than $0.8\times\rho_o$.

DETAILED DESCRIPTION OF THE INVENTION

The devices which are treated by the method of the invention contain at least one electrode and generally contain two (or more) electrodes which can be connected to a source of electrical power and which, when so connected, cause current to flow through the PTC element. The electrode(s) may be in physical contact with the PTC element or separated therefrom by electrically conductive material, e.g. a conductive polymer. Preferably the device is one prepared by melt-shaping the PTC composition around the electrode(s). The PTC composition can if desired be cross-linked prior to or after the annealing step.

The melting point of the second polymer, $T_2$, is preferably at least $(T_1+50)$°C., particularly at least $(T_1+70)$°C., especially at least $(T_1+90)$°C. When it is desired that the composition be stable on exposure to high temperatures $T_2$ is preferably at least 160° C., particularly at least 200° C., especially at least 230° C. The mixture of crystalline polymers need not be a physical mixture of two distinct polymers but may be a single polymer, e.g. a block copolymer, having distinct segments such that the polymer has two distinct melting points. The melting points referred to are the peak values of the peaks of a DSC (differential scanning calorimeter) curve. $T_2$ is preferably at least 160° C., especially at least 200° C., particularly at least 230° C., when it is desired that the composition is stable on exposure to high temperatures. $T_1$ is selected for the desired switching temperature ($T_s$) of the composition, and may be for example 100° C. to 175° C. One or both of the polymers may be a fluorinated polymer, for example the lower melting polymer may be polyvinylidene fluoride and the higher melting polymer an ethylene/tetrafluoroethylene polymer. The polymer component can also contain other polymers, e.g. elastomers. Each of the polymers is crystalline, and this term is used herein to mean that that the polymer has a crystallinity of at least 1%, preferably at least 5%, particularly at least 10%, especially at least 20%, as measured by X-ray diffraction.

The ratio by weight of the first polymer to the second polymer is preferably from 1:3 to 3:1, particularly from 1:2 to 2:1. The first and second polymers are preferably incompatible with each other.

PTC compositions as described above are described and claimed in the International application entitled "PTC compositions" filed contemporaneously herewith by Raychem Corporation, the assignees of this application; No. 8,000,592 the disclosure of that International application is incorporated herein by reference.

The temperature at which the PTC element is annealed, $T_A$, is preferably above $(T_1+5)$°C., particularly above $(T_1+10)$°C., and below $(T_2-10)$°C., particularly below $(T_2-40)$°C., especially below $(T_2-75)$°C. $T_A$ will often be closer to $T_1$ than to $T_2$. The composition is preferably annealed for a time such that $\rho_A$ is less than $0.8\times\rho_o$, particularly less than $0.6\times\rho_o$, e.g. 0.1 to $0.8\times\rho_o$, and in some cases to much lower levels, e.g. less than $0.1\times\rho_o$; the annealing time will typically be at least 2 hours, e.g. 4 to 10 hours. $\rho_A$ is preferably $10^2$ to $10^5$ ohm.cm.

If desired, the heat-treatment of the device in order to anneal the composition can also effect melt fusion between the PTC element and a layer of a second polymeric composition placed around the PTC element, as described and claimed in my copending, commonly assigned application Ser. No. 150,910 entitled "Novel PTC devices and their preparation" filed contemporaneously herewith, the disclosure of which is incorporated hereby by reference.

The invention is illustrated by the following Example.

EXAMPLE

The ingredients used in this Example are given in the Table below.

The ingredients for Composition A were dry-blended, and the blend fed to a Werner Pfleiderer ZSK co-rotating twin screw extruder heated to about 260° C. and fitted with a pelletizing die. The extrudate was chopped into pellets.

The ingredients for Composition B were dry-blended and the blend fed to a Werner-Pfleiderer ZSK extruder heated to 315°–345° C. and fitted with a pelletizing die. The extrudate was chopped into pellets.

Two parts by weight of the pellets of Composition B and one part by weight of the pellets of composition A were dry-blended together and then dried in air for about 16 hours at about 150° C. The dried blend was melt-extruded at 315°–340° C. through a single screw extruder fitted with a cross-head die around two pre-heated 18 AWG stranded nickel-coated copper wires whose centers are about 0.29 inch apart, to produce an extrudate having a cross-section of dumbbell shape, the distance between the closest points of the electrodes being about 0.235 inch the thickness of the central section (t) being about 0.030 inch and the thickness of the end sections (d) being about 0.070 inch. After the extrudate had cooled, two jackets were extruded around it, the inner jacket being 0.02 inch thick and composed of polyvinylidene fluoride having a melting point of about 156° C. (Kynar 460 from Pennwalt) and the outer being 0.025 inch thick and composed of a fluorinated ethylene/propylene copolymer having a melting point of about 247° C. (Teflon FEP 100 from du Pont). The jacketed strip was annealed at 175° C. in air for 4 to 9 hours.

TABLE

| | Comp. A | | Comp. B | | Final Mix | |
|---|---|---|---|---|---|---|
| | Wt. % | Vol % | Wt. % | Vol % | Wt % | Vol % |
| Polyvinylidene Fluoride having a melting point of about 160° C. (Kynar 451 from Pennwalt) | 88.0 | 89.2 | | | 29.3 | 32.0 |
| $CaCO_3$ (Omya Bsh from Omya Inc.) | 3.0 | 2.0 | | | 1.0 | 0.7 |
| Carbon Black (Vulcan XC-72 from Cabot, particle size 300 Angstroms, surface area 254 $m^2/g$) | 9.0 | 8.8 | | | 3.0 | 3.2 |
| Ethylene/tetrafluoroethylene copolymer having a melting point of about 270° C. (Tefzel 2010) | | | 64.6 | 75.5 | 43.1 | 48.4 |
| Carbon Black (Continex HAF from Continental Carbon, particle size 290 Angstroms, surface area 80 $m^2/g$) | | | 15.0 | 16.5 | 10.0 | 10.6 |
| ZnO (Kadox 515 from Gulf and Western) | | | 20.0 | 7.2 | 13.3 | 4.5 |
| Processing aid | | | 0.4 | 0.8 | 0.3 | 0.6 |

I claim:

1. A method of modifying the electrical characteristics of an electrical device comprising (a) a PTC element composed of a conductive polymer composition which exhibits PTC behavior and (b) at least two electrodes which can be connected to a source of electrical power and which, when so connected, cause current to flow through said PTC element, said conductive polymer composition comprising (i) a polymer component which comprises a mixture of a first crystalline polymer having a first melting point $T_1$ and a second crystalline polymer having a second melting point $T_2$ which is at least 160° C. and at least $(T_1+25)$°C., and (ii) a particulate filler component which has been dispersed in said polymer component and which comprises a conductive filler;

which method comprises annealing said device at a temperature $T_A$ which is between $T_1$ and $T_2$ for a time sufficient to reduce the resistivity at 25° C. of said conductive polymer composition from a first value, $\rho_o$, prior to said annealing to a second value, $\rho_A$, after said annealing, where $\rho_A$ is less than $0.8\times\rho_o$.

2. A method according to claim 1 wherein $T_2$ is at least $(T_1+50)$°C.

3. A method according to claim 2 wherein $T_2$ is at least $(T_1+70)$°C.

4. A method according to claim 3 wherein $T_2$ is at least $(T_1+90)$°C.

5. A method according to claim 1 wherein $T_A$ is between $(T_1+5)$ and $(T_2-10)$°C.

6. A method according to claim 5 wherein $T_A$ is between $(T_1+5)$ and $(T_2-40)$°C.

7. A method according to claim 6 wherein $T_A$ is between $(T_1+5)$ and $(T_2-75)$°C.

8. A method according to claim 6 wherein $T_A$ is between $(T_1+10)$ and $(T_2-40)$°C.

9. A method according to claim 1 wherein $T_2$ is at least 200° C.

10. A method according to claim 9 wherein $T_2$ is at least 230° C.

11. A method according to claim 9 wherein $T_1$ is 100° C. to 175° C.

12. A method according to claim 1 wherein each of the crystalline polymers is a fluorinated polymer.

13. A method according to claim 12 wherein the first crystalline polymer is polyvinylidene fluoride and the second crystalline polymer is an ethylene/tetrafluoroethylene copolymer.

14. A method according to claim 1 wherein the ratio by weight of the first polymer to the second polymer is from 1:3 to 3:1.

15. A method according to claim 14 wherein said ratio is from 1:2 to 2:1.

16. A method according to claim 1 wherein said crystalline polymer component is substantially free from cross-linking.

17. A method according to claim 1 wherein said first and second crystalline polymers are incompatible with each other.

18. A method according to claim 1 wherein $\rho_A$ is less than $0.6 \times \rho_o$.

19. A method according to claim 1 wherein $\rho_A$ is 0.1 to $0.8\rho_o$.

20. A method according to claim 1 wherein $\rho_A$ is $10^2$ to $10^5$ ohm.cm.

21. A method according to claim 1 wherein said electrical device is a heater.

22. A method according to claim 1 wherein said electrical device is a strip heater comprising the PTC element melt-shaped around the electrodes.

23. A method of modifying the electrical characteristics of an electrical heater which comprises (a) a PTC element composed of a melt-extruded conductive polymer composition exhibiting PTC behavior and (b) at least two electrodes which can be connected to a source of electrical power and when so connected cause current to flow through the PTC element, said conductive polymer composition comprising (i) a polymer component which comprises a mixture of a first crystalline fluorinated polymer having a first melting point $T_1$ which is from 100° C. to 175° C. and a second crystalline fluorinated polymer having a second melting point $T_2$ which is at least 160° C. and at least $(T_1+50)$°C., the ratio by weight of the first polymer to the second polymer being from 1:2 to 2:1, and (ii) a particulate filler component which has been dispersed in said polymer component and which comprises a conductive carbon black; which method comprises annealing said heater at a temperature $T_A$ which is between $(T_1+5)$°C. and $(T_2+40)$°C. for a time sufficient to reduce the resistivity at 25° C. of said conductive polymer composition from a first value, $\rho_o$, prior to said annealing to a second value, $\rho_A$ after said annealing, where $\rho_A$ is less than $0.6 \times \rho_o$ and is from $10^2$ to $10^5$ ohm.cm.

24. A method according to claim 23 wherein $T_2$ is at least $(T_1+70)$°C.

25. A method according to claim 23 wherein $T_A$ is between $(T_1+5)$ and $(T_2-75)$°C.

26. A method according to claim 23 wherein $T_A$ is between $(T_1+10)$ and $(T_2-40)$°C.

27. A method according to claim 23 wherein $T_2$ is at least 200° C.

28. A method according to claim 23 wherein the first crystalline polymer is polyvinylidene fluoride and the second crystalline polymer is an ethylene/tetrafluoroethylene copolymer.

29. A method according to claim 23 wherein said crystalline polymer component is substantially free from cross-linking.

* * * * *

UNITED STATES PATENT AND TRADEMARK OFFICE

CERTIFICATE OF CORRECTION

PATENT NO. : 4,318,881

DATED : March 9, 1982

INVENTOR(S) : Umesh K. Sopory

It is certified that error appears in the above-identified patent and that said Letters Patent are hereby corrected as shown below:

In claim 23, column 6, line 10: "$(T_2+40)°C$." should read --$(T_2-40)°C$.--.

On the title page

In References Cited, add thereto:

--Foreign Patent Documents 2755076 12/1977 Germany (OLS)--.

Signed and Sealed this

*Eleventh* Day of *September 1984*

[SEAL]

*Attest:*

GERALD J. MOSSINGHOFF

*Attesting Officer*

*Commissioner of Patents and Trademarks*